United States Patent
Buschatz

(10) Patent No.: US 6,404,321 B1
(45) Date of Patent: Jun. 11, 2002

(54) ACTUATOR

(75) Inventor: Immanuel Buschatz, Unterensingen (DE)

(73) Assignee: Behr Thermot-tronik GmbH & Co. (DE)

(*) Notice: Subject to any disclaimer, the term of this patent is extended or adjusted under 35 U.S.C. 154(b) by 0 days.

(21) Appl. No.: 09/526,781

(22) Filed: Mar. 16, 2000

(30) Foreign Application Priority Data

Mar. 23, 1999 (DE) .................................. 299 05 274 U

(51) Int. Cl.$^7$ ..................... H01H 37/46; H01H 37/48; H01H 71/18
(52) U.S. Cl. ..................... 337/393; 337/394; 337/388; 337/382; 236/87; 236/101 R; 236/96
(58) Field of Search .................. 337/116, 79, 241, 337/244, 332, 382, 393, 394, 384, 388; 236/5, 33, 43, 54, 66, 59, 72, 87, 96, 101 R

(56) References Cited

U.S. PATENT DOCUMENTS

| | | | | | |
|---|---|---|---|---|---|
| 3,665,363 A | * | 5/1972 | Rosenberg et al. | ......... | 337/361 |
| 4,220,942 A | * | 9/1980 | Meister et al. | ............... | 337/277 |
| 4,225,841 A | * | 9/1980 | Saur et al. | ................... | 337/393 |
| 4,389,629 A | * | 6/1983 | Saur et al. | ................... | 337/126 |
| 4,575,704 A | * | 3/1986 | Pezold | ........................ | 337/197 |
| 4,673,928 A | * | 6/1987 | Guim | ......................... | 340/638 |
| 5,012,495 A | * | 4/1991 | Munroe et al. | ................. | 337/3 |
| 5,113,169 A | * | 5/1992 | Ruehl et al. | ................. | 337/265 |
| 5,270,799 A | * | 12/1993 | Rose | ........................... | 337/354 |
| 5,897,055 A | * | 4/1999 | Saur et al. | .................... | 337/393 |
| 6,008,715 A | * | 12/1999 | Gottfried et al. | ........... | 337/244 |
| 6,204,747 B1 | * | 3/2001 | Kitchens | ..................... | 337/407 |

FOREIGN PATENT DOCUMENTS

DE 2625561 * 12/1977 .......... F02M/31/06

* cited by examiner

Primary Examiner—Anatoly Vortman
(74) Attorney, Agent, or Firm—Kennedy Covington Lobdell & Hickman, LLP

(57) ABSTRACT

An actuator for a device such as a valve controlling coolant for an automotive engine. The actuator has a base body on which is supported an electrically heatable thermostatic operating element having an operating piston that moves a motion transfer member that is in actuating engagement with a moveable actuating element of the device being actuated. The motion transfer member has a flange on which is supported a compression spring that maintains the motion transfer member in following engagement with the operating piston. The components of the actuator are enclosed within an outer housing that has a window of transparent material located so that when the components are in the Inactivated condition, the flange will not be visible through the window and when the components are activated, the flange will be visible through the window, thereby providing an indication of the condition of the actuator.

3 Claims, 1 Drawing Sheet

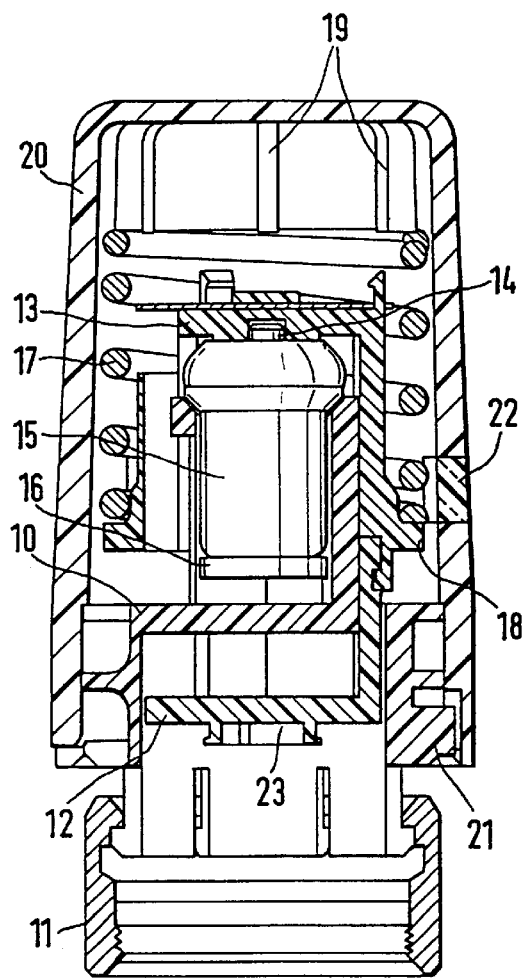
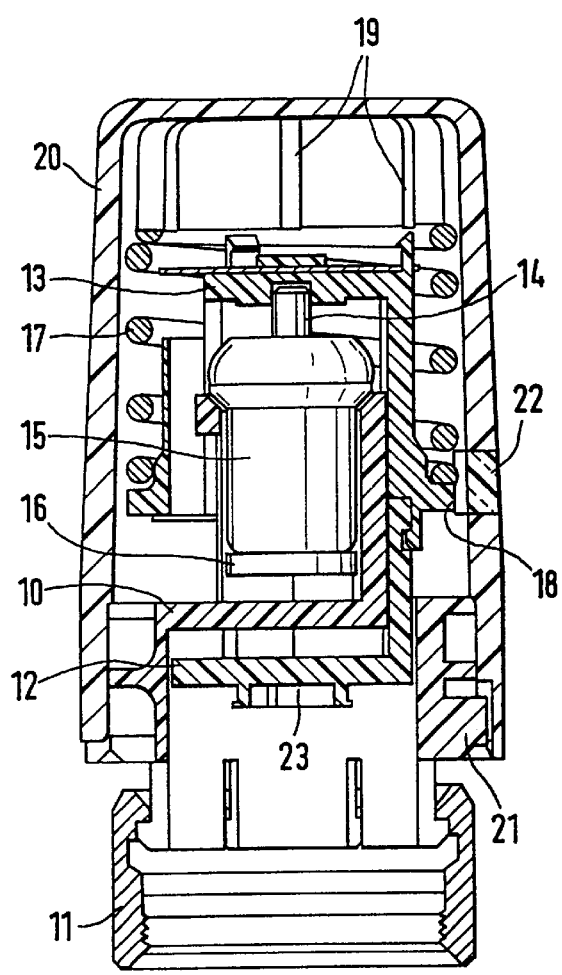

ACTUATOR

FIELD OF THE INVENTION

The invention relates to an actuator with an electrically heatable thermostatic operating element mounted on a stationary body member and actuated by a heating element to move an operating piston that is in engagement with a motion transfer member that is biased by a compression spring, with the actuator having a housing that encloses the thermostatic operating element, the operating piston, the heating element, the motion transfer member, and the compression spring.

BACKGROUND OF THE INVENTION

An actuator of this type is known, for example in U.S. Pat. No. 5,897,055 (German Patent Disclosure DE 197 05 721 A1). In that construction, it is not possible to detect the position of the actuator or to perform any function monitoring, without dismantling the outer housing.

In some actuators of this general type, an indicating element is provided that projects through the housing and is manipulated by an element of the actuator that moves with the operating piston so that the indicating element provides a visible indication of the position of the actuator exteriorly of the housing. This design requires an opening in the housing, with the risk of leakage. Moreover, additional parts are necessary to incorporate this feature.

OBJECT AND SUMMARY OF THE INVENTION

It is the object of the present invention to provide an actuator with a simple way of monitoring the operating position of the components of the actuator. This object is attained by forming the outer housing at least partly of transparent material.

By the present invention, it is possible to observe one or more of the elements that move along with the operating piston of the thermostatic operating element, so that functional monitoring can be done in a simple way and the position of the actuator can be detected. The transparent material can be as clear as glass. However, even a milky to cloudy transparency suffices, since even then, motions and/or positions of components can still be readily detected. The particular advantage then is that no openings or the like through which moisture and/or contaminants could penetrate have to be provided in the outer housing.

In a specific embodiment of the invention, the transparent material is formed on a window in the housing, located where a component that moves with the operating piston can be viewed through the window. Such a window suffices to permit effective functional monitoring and/or the indication or display of the function.

Further characteristics and advantage of the invention will become apparent from the following description of the exemplary embodiment shown in the drawing.

BRIEF DESCRIPTION OF THE DRAWINGS

FIG. 1 is a vertical sectional view of an actuator of the preferred embodiment of the present invention with the components in the position where the thermostatic operating element component is unheated; and FIG. 2 is a view similar to FIG. 1 with the components in the position where the thermostatic operating element has been actuated by heat.

DESCRIPTION OF THE PREFERRED EMBODIMENT

The actuator shown in FIGS. 1 and 2 corresponds in its basic layout to the actuator disclosed in U.S. Pat. No. 5,897,055 (German Patent Disclosure DE 197 05 721 A1), which is incorporated by reference. The actuator includes a base body 10, which can be secured by a union nut 11 to threads of a device to be actuated, such as a valve or the like, e.g., a thermostatic valve for controlling flow of coolant in an automotive engine. A motion transfer member, assembled from two parts 12, 13, is disposed in the base member 10 for movement relative thereto, and the operating piston 14 of a thermostatic operating element 15 is in operable engagement therewith. The thermostatic operating element 15 is supported in stationary fashion in the body member 10 and is seated on an electric heating element 16, such as a positive temperature coefficient resister (PTC) supported on the base body 10. This PTC resister is connected to an electric current source in the manner disclosed in U.S. Pat. No. 5,897,055 (German Patent Disclosure DE 197 05 721 A1). The thermostatic operating element 15 is oriented such that the operating piston 14 moves in a direction away from the union nut 11 when the operating element 15 is actuated. For this purpose, the operating element 15 contains an expanding element, preferably a wax mixture, that expands when heated.

With this arrangement of the components, when the electric heating element 16 is energized, it heats the operating element 15 to cause expansion of the wax mixture in the operating element 15, thereby forcing the operating piston 14 outward, which in turn moves the motion transfer member 12, 13 against the bias of the compression spring 17, which movement results in the motion transfer member 12, 13 to move an actuating element of the device being actuated.

The compression spring 17 is supported on a flange 18 of one part 13 of the transfer member 12, 13. The opposite end of the compression spring 17 is prestressed against ribs 19 of an outer housing 20 that encloses the thermostatic operating element 15, operating piston 14, heating element 16, compression spring 17, motion transfer member 12, 13, and the base body 10. The outer housing is closed in an inverted cuplike form fashion, and it is secured by an open edge, pointing in the direction of the union nut 11, to a flange 21 of the base body 10. An additional seal by means of a seating composition is preferably also provided both in the region of this fastening point and in the region of an electrical cable lead-in.

On its side toward the union nut 11, the part 12 of the motion transfer member 12, 13 has a support point 23 for an element to be actuated, in particular a heating valve tappet that is urged by spring force toward the part 12.

Functional monitoring of the actuator is possible when the actuator is not yet installed, or in other words when the union nut 11 is not yet secured to a threaded stem of a valve. It is then possible to observe what position the part 12 is assuming or has taken when the heating element 16 is heated by electric current.

To enable functional monitoring even without dismantling, the outer housing 20 is provided in the region of one side wall with a window 22 of transparent material, which can for instance be a transparent plastic part co-injected into the plastic injection-molded outer housing 20. Such a window 22 suffices to observe the parts that move with the operating piston 14, in particular the flange 18 of the part 13 of the transfer member on which the compression spring 17 is supported.

The flange 18 of the motion transfer member 12, 13 is moved during operation of the actuator from one terminal position to another terminal position. In FIG. 1, the components of the actuator are in the position when the heating element 16 is not energized. In this position, the terminal position of the flange 18 is in a down position. In FIG. 2, the components of the actuator are shown in the position when the heating element 16 is energized and the operating piston 14 is projecting upwardly from the operating element 15, thereby raising the motion transfer member 12, 13 and its flange 18 to an uppermost position. The window 22 is located so that when the flange 18 is in its lowermost position (FIG. 1), it is not viewable through the window 22, and when it is in its raised terminal position (FIG. 2), it is viewable through the window. Thus, the condition of the actuator can be readily determined simply by looking through the window.

To make the flange 18 readily visible, it may for instance be provided that the part 13 be made from a light-colored plastic,. and that the cylindrical outer surface of the flange 18 be provided with a dark color, such as red. In that case, the flange, when it is located in the region of the window 22, is clearly visible even when the window 22 is not made of a transparent material that is as clear as glass but instead is milky.

In principle, it possible to provide a window of transparent material at some other point on the outer housing as well, from which the motion of a component that moves with the working piston 14 is visible. In particular, it is also possible to make the entire outer housing 20 of a transparent material, so that overall, it is easy to monitor the operability of all the elements. Preferably, the window 22 in the outer housing 20 extends over at least one-quarter of the circumference of the housing to provide adequate viewing.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An-actuator comprising:

stationary base body, an electrically heatable thermostatic operating element supported on said be body and having a piston movable in response to heating and cooling of said operating element, a motion transfer member disposed within said actuator and extending for actuating movement, and forming a follower for said operating element piston, said motion transfer member having a flange formed thereon, a compression spring engaging said motion transfer member flange for biasing said motion transfer member in following engagement with said operating piston, and a housing enclosing said thermostatic operating element, said motion transfer member and said compression spring, said housing having at least a portion in the form of a window of transparent material disposed at a location for viewing the position of said motion transfer member flange therethrough.

2. An actuator according to claim 1 wherein said flange moves from one terminal position to another terminal position, in one of said terminal positions said flange is not viewable through said window and in the other terminal position the flange is viewable through said window.

3. An actuator according to claim 1 wherein said window extends over at least one-quarter of the circumference of the housing.

* * * * *